(12) United States Patent
Shiogai et al.

(10) Patent No.: US 10,501,126 B2
(45) Date of Patent: Dec. 10, 2019

(54) MOUNTING STRUCTURE OF EXTERIOR PART

(71) Applicant: Honda Access Corp., Niiza-shi, Saitama (JP)

(72) Inventors: Ryo Shiogai, Niiza (JP); Masahiro Abe, Niiza (JP)

(73) Assignee: HONDA ACCESS CORP., Niiza-shi, Saitama (JP)

( * ) Notice: Subject to any disclaimer, the term of this patent is extended or adjusted under 35 U.S.C. 154(b) by 49 days.

(21) Appl. No.: 15/819,065

(22) Filed: Nov. 21, 2017

(65) Prior Publication Data

US 2018/0178854 A1    Jun. 28, 2018

(30) Foreign Application Priority Data

Dec. 27, 2016    (JP) .................................. 2016-252410

(51) Int. Cl.
  *B62D 29/04*    (2006.01)
  *B62D 35/00*    (2006.01)

(52) U.S. Cl.
  CPC ......... *B62D 29/048* (2013.01); *B62D 35/007* (2013.01); *B60Y 2410/113* (2013.01); *Y02T 10/82* (2013.01)

(58) Field of Classification Search
  CPC ................ B62D 29/048; B62D 35/007; B60Y 2410/113; Y02T 10/82
  See application file for complete search history.

(56) References Cited

U.S. PATENT DOCUMENTS

2012/0144648 A1* 6/2012 Iwamoto ................. B60R 19/48
                                                          29/428

FOREIGN PATENT DOCUMENTS

| CN | 105593070 A | 5/2016 |
| CN | 205395997 U | 7/2016 |
| JP | 2002-104095 A | 4/2002 |
| JP | 2011-11700 A | 1/2011 |

OTHER PUBLICATIONS

Office Action dated Oct. 18, 2018, issued in counterpart Taiwanese Application No. 106145771. (3 pages).

* cited by examiner

*Primary Examiner* — D Glenn Dayoan
*Assistant Examiner* — Melissa A Black
(74) *Attorney, Agent, or Firm* — Westerman, Hattori, Daniels & Adrian, LLP

(57) ABSTRACT

In a mounting structure of an exterior part, a molding has a recess capable of being fitted to an outer periphery of the exterior part, as seen in a cross-sectional view. The outer periphery includes a recessed corner portion at which two sides of the outer periphery cross each other. One of the two sides constituting the recessed corner portion includes a protrusion capable of being fitted into the recess of the molding. The other of the two sides includes a cutout portion disposed adjacent to the protrusion, the cutout portion permitting insertion of the molding therethrough under a condition where the exterior part is mounted on a front surface of a main member. The exterior part is mounted on the front surface of the main member under a condition where an end portion of the molding mounted on the one side is inserted into the cutout portion.

8 Claims, 7 Drawing Sheets

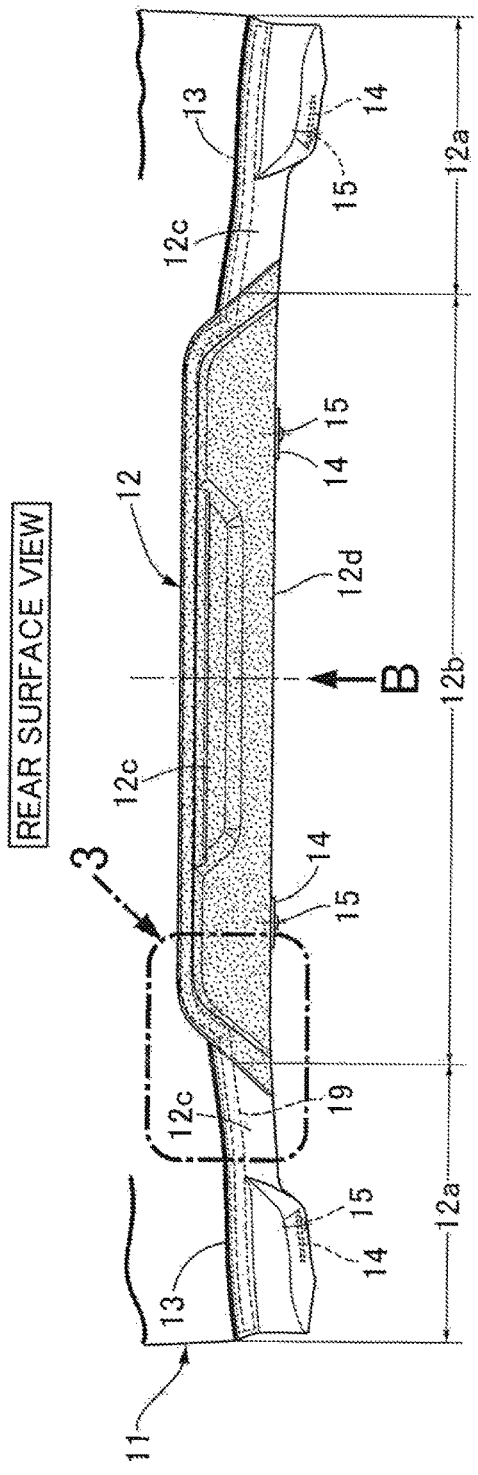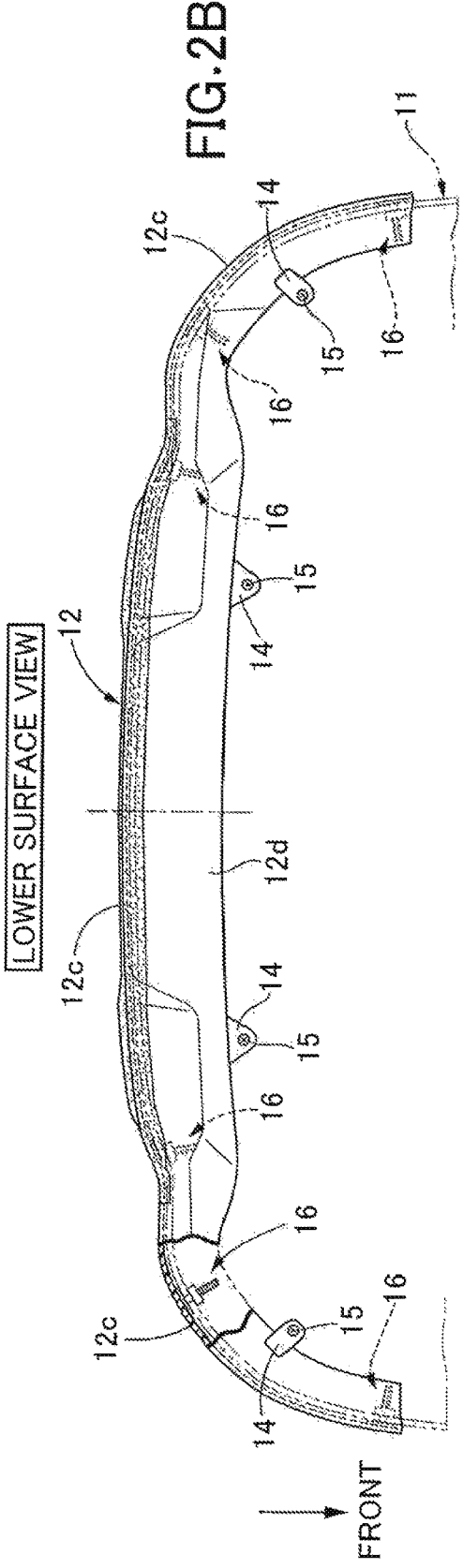

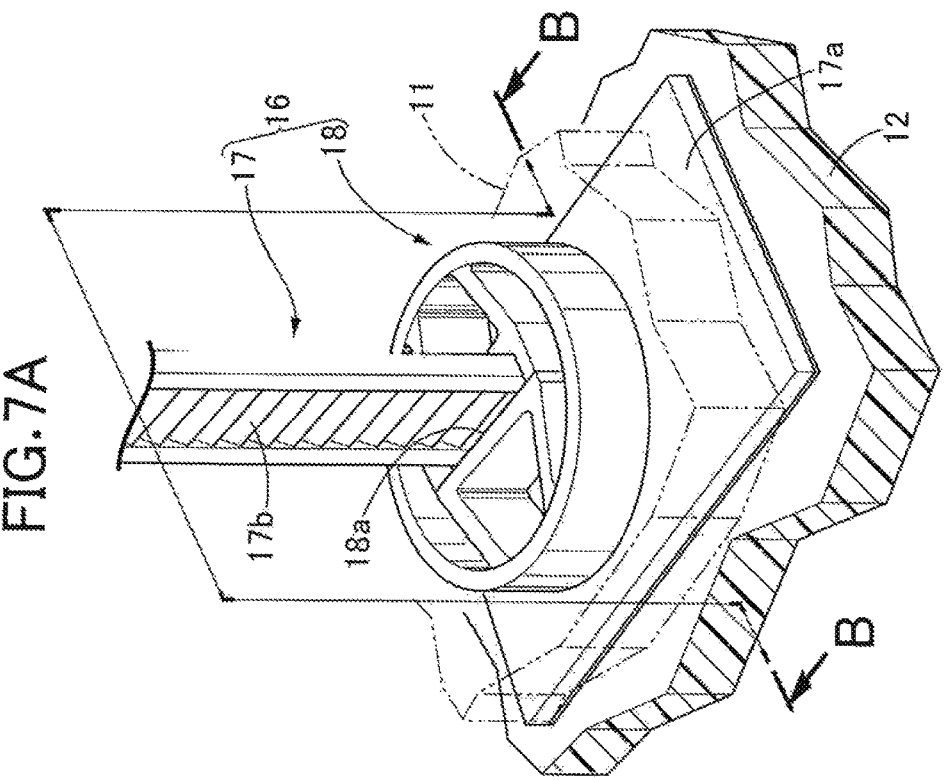
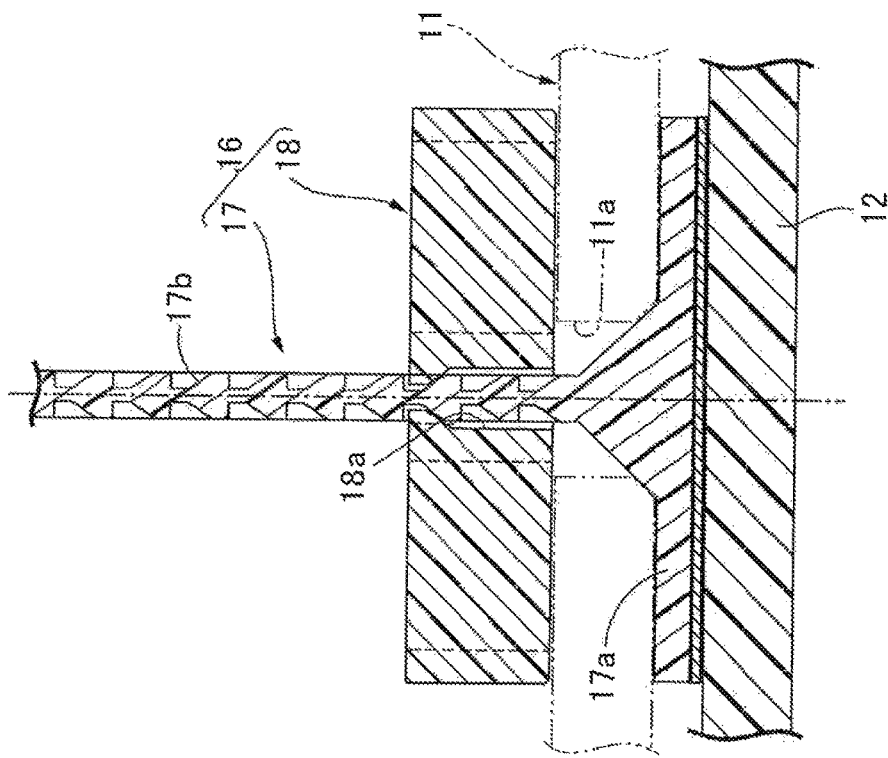

MOUNTING STRUCTURE OF EXTERIOR PART

BACKGROUND OF THE INVENTION

Field of the Invention

The present invention relates to a mounting structure of an exterior part comprising: a main member; the exterior part mounted on a front surface of the main member; and a long molding mounted along an outer periphery of the exterior part so as to fill a gap between the exterior part and the front surface of the main member, the outer periphery forming an outline of the exterior part.

Japanese Patent Application Laid-open No. 2011-11700 discloses, in Background Art thereof, a technique for achieving aesthetic appearance in installation of a spoiler on an automobile bumper by mounting a molding in a gap produced between an outer periphery of the spoiler and a surface of the bumper.

Description of the Related Art

To install the molding in the gap produced between the outer periphery of the spoiler and the surface of the bumper, an approach may be taken in which an end portion of the molding is cut and abutted against a shoulder portion of the spoiler or a shoulder portion of the bumper. However, this approach may cause degraded aesthetic appearance because of variations in a cut length of the end portion of the molding. Specifically, the molding, if too short, may produce a gap in the end portion and the molding, if too long, may cause an intermediate portion thereof to be raised by the end portion being pushed.

SUMMARY OF THE INVENTION

The present invention has been made in view of the foregoing situation and it is an object of the present invention to achieve aesthetic appearance of an end portion of a molding that is installed in a gap produced between an outer periphery of an exterior part and a surface of a main member.

In order to achieve the object, according to a first feature of the present invention, there is provided a mounting structure of an exterior part comprising: a main member; the exterior part mounted on a front surface of the main member; and a long molding mounted along an outer periphery of the exterior part so as to fill a gap between the exterior part and the front surface of the main member, the outer periphery forming an outline of the exterior part, wherein the molding has a recess as seen in a cross-sectional view, the recess being capable of being fitted to the outer periphery of the exterior part, the outer periphery of the exterior part includes a recessed corner portion at which two sides of the outer periphery of the exterior part cross each other, one of the two sides that constitute the recessed corner portion includes a protrusion capable of being fitted into the recess of the molding and an other of the two sides includes a cutout portion disposed adjacent to the protrusion, the cutout portion permitting insertion of the molding therethrough under a condition in which the exterior part is mounted on the front surface of the main member, and the exterior part is mounted on the front surface of the main member under a condition in which an end portion of the molding mounted on the one side is inserted into the cutout portion.

With the first feature, when the exterior part is mounted on the front surface of the main member, the long molding is mounted along the outer periphery forming the outline of the exterior part so as to fill the gap between the exterior part and the front surface of the main member. The molding has, as seen in a cross-sectional view, the recess that can be fitted to the outer periphery of the exterior part. The outer periphery of the exterior part includes the recessed corner portion at which two sides of the outer periphery of the exterior part cross each other. The one of the two sides that constitute the recessed corner portion includes the protrusion that can be fitted into the recess in the molding. The other of the two sides has the cutout portion disposed adjacent to the protrusion, the cutout portion permitting insertion of the molding therethrough under the condition in which the exterior part is mounted on the front surface of the main member. The exterior part is mounted on the front surface of the main member under the condition in which the end portion of the molding mounted on the one side is inserted in the cutout portion. Therefore, a gap that may be produced between the end portion of the molding and the other side of the recessed corner portion of the exterior part when the length of the molding is too short can be prevented from being produced, or the molding can be prevented from being raised as a result of the end portion of the molding abutting against the other side of the recessed corner portion of the exterior part when the length of the molding is too long. Thus, aesthetic appearance of the mounting portion of the exterior part with respect to the main member is enhanced.

According to a second feature of the present invention, in addition to the first feature, the exterior part is a plate-shaped member formed of resin; the molding is fixed so as to be clamped between the front surface of the main member and a molding mounting seat surface formed along the outer periphery of the exterior part; and a length, along the cutout portion at the recessed corner portion, of the molding mounting seat surface is equivalent to a wall thickness, around the recessed corner portion, of the exterior part.

With the second feature, the exterior part is a plate-shaped member formed of resin and the molding is fixed so as to be clamped between the front surface of the main member and the molding mounting seat surface formed along the outer periphery of the exterior part. Thus, the molding mounting strength increases with an increasing length of the molding mounting seat surface. An excessively long length, along the cutout portion at the recessed corner portion, of the molding mounting seat surface, however, increases a wall thickness of the resin exterior part locally at that particular portion, so that a sink mark may occur on the surface. With the second feature, however, the length, along the cutout portion at the recessed corner portion of, of the molding mounting seat surface is equivalent to the wall thickness, around the recessed corner portion, of the exterior part. Therefore, the wall thickness of the exterior part is not increased locally, so that occurrence of the sink mark can be prevented.

According to a third feature of the present invention, in addition to the first or second feature, the exterior part is painted in a plurality of colors having different levels of brightness; and the molding is mounted to a portion painted in color having a high level of brightness, but not to a portion painted in color having a low level of brightness.

With the third feature, a gap between the main member and the exterior part is recognized as black. A gap existing between the exterior part having a low level of brightness and the main member is thus hard to be recognized. In contrast, a gap existing between the exterior part having a high level of brightness and the main member is easily recognized. The exterior part is painted in a plurality of colors having different levels of brightness. The molding is mounted to a portion painted in color having a high level of brightness, but not to a portion painted in color having a low level of brightness. Thus, gaps that are noticeable can be covered by the molding with a minimum essential length, thereby achieving aesthetic appearance. Because in a boundary portion at which the painted color changes, presence or absence of the molding is switched, the exterior part is recognized as including a plurality of components painted in different colors from each other, so that the degree of freedom in design can be enhanced.

According to a fourth feature of the present invention, in addition to any one of the first to third features, the exterior part and the main member are fixed by a tensile clip disposed near the cutout portion.

With the fourth feature, the exterior part and the main member are fixed by the tensile clip disposed near the cutout portion. The clip can thus prevent the exterior part from separating from the main member at a portion near the cutout portion, so that the molding can be reliably prevented from being dislocated or removed.

Note that a bumper 11 of an embodiment corresponds to the main member of the present invention, and a spoiler 12 of the embodiment corresponds to the exterior part of the present invention.

The above and other objects, characteristics and advantages of the present invention will be clear from detailed descriptions of the preferred embodiment which will be provided below while referring to the attached drawings.

BRIEF DESCRIPTION OF THE DRAWINGS

FIGS. 2A and 2B are views taken in a direction of an arrow 2A in FIG. 1.

FIGS. 7A and 7B are views showing a structure of a tensile clip.

DESCRIPTION OF THE PREFERRED EMBODIMENT

An embodiment of the present invention is explained below based on FIGS. 1 to 7B.

Figure 1:
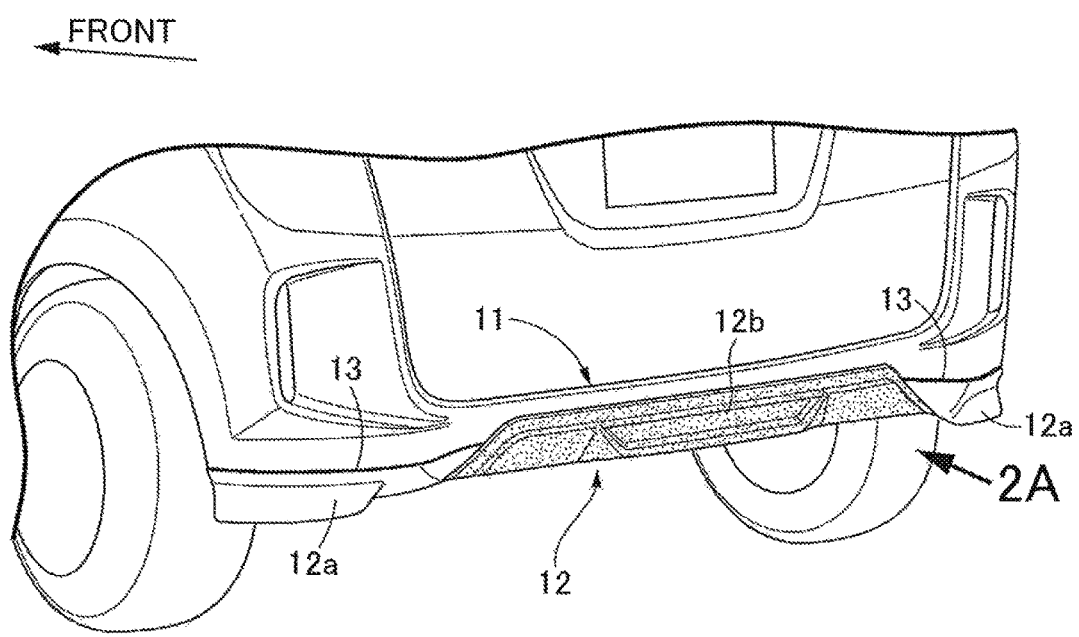
FIG. 1 is a perspective view of a rear part of a vehicle body of an automobile.
Figure 3:
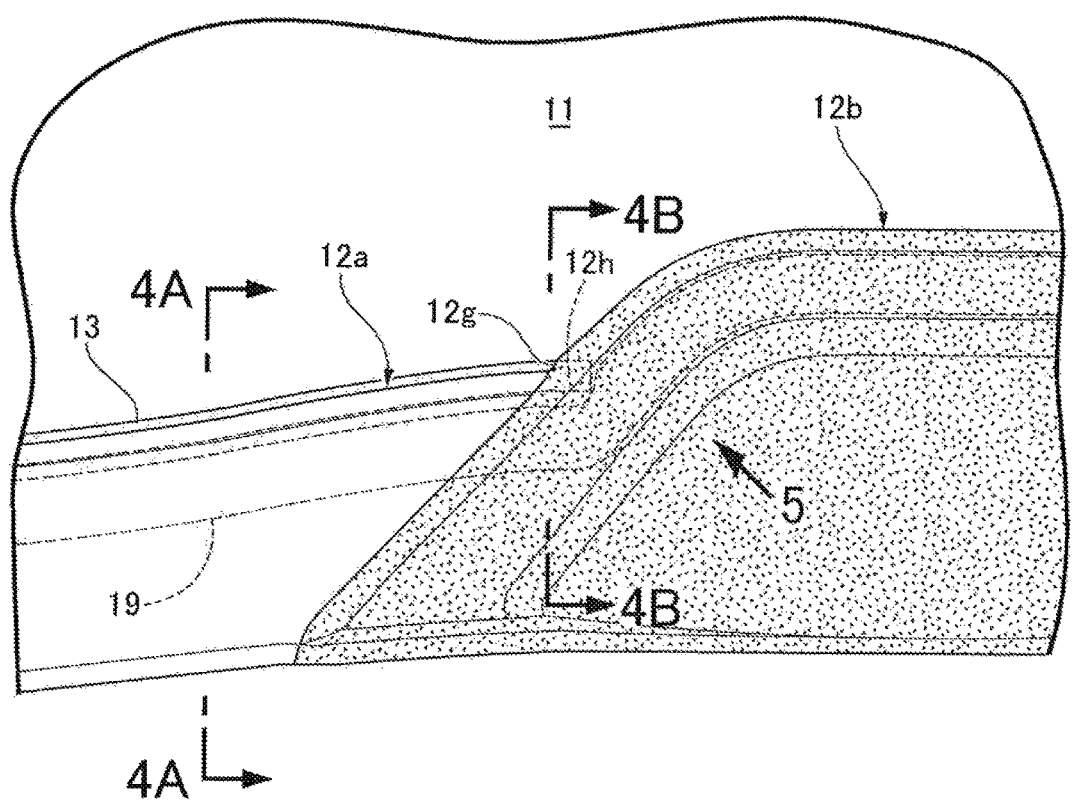
FIG. 3 is an enlarged view of a part 3 in FIG. 2.

Reference is made to FIGS. 1 to 2B. An automobile includes a bumper 11 disposed at a rear portion thereof. The bumper 11 is integrated with a vehicle body and extends in a vehicle width direction. A spoiler 12 formed of a synthetic resin is installed on the bumper 11 so as to extend from a rear surface to a lower surface of the bumper 11. The spoiler 12 has left and right end portions in the vehicle width direction 12a painted in color identical to a color of the vehicle body, having a relatively high level of brightness. Additionally, the spoiler 12 has a central portion in the vehicle width direction 12b painted in black having a low level of brightness. A pair of left and right moldings 13 formed of rubber is installed between the rear surface of the bumper 11 and upper edges of the end portions in the vehicle width direction 12a of the spoiler 12, painted in the same color as the color of the vehicle body.

The spoiler 12 is a member having a substantially L-shaped section, including a rear wall portion 12c facing to the rear of the vehicle body and a lower wall portion 12d facing downward. The central portion in the vehicle width direction 12b protrudes rearwardly and upwardly with respect to the end portions in the vehicle width direction 12a. Four brackets 14 are provided to protrude toward the front from the lower wall portion 12d of the spoiler 12. Tapping screws 15 that pass through the brackets 14 from below upward are threadedly engaged with the lower surface of the bumper 11 to thereby fix the spoiler 12 to the bumper 11. Additionally, the spoiler 12 is fixed to the bumper 11 by six tensile clips 16.

Reference is made to FIGS. 7A and 7B. The tensile clip 16 includes a coupling pin 17 and a clip 18. The coupling pin 17 includes a plate-shaped mounting portion 17a and a strip-shaped coupling pin main unit 17b extending from the mounting portion 17a. The plate-shaped clip 18 has a lock hole 18a through which the coupling pin main unit 17b passes. The mounting portion 17a of the coupling pin 17 is fixed to a back surface of the spoiler 12 by, for example, bonding. The coupling pin main unit 17b that passes through a mounting hole 11a of the bumper 11 is inserted into the lock hole 18a of the clip 18 and then pulled. This causes a concave-convex portion formed in the coupling pin main unit 17b to be engaged with a concave-convex portion formed in the lock hole 18a. This results in the bumper 11 being clamped and fixed between the mounting portion 17a of the coupling pin 17 and the clip 18.

Moreover, as shown in FIGS. 2A to 4B, to prevent an upper edge portion of the spoiler 12 from separating from the bumper 11, the back surface of the spoiler 12 is fixed to the front surface of the bumper 11 by a double-sided adhesive tape 19 extending in the vehicle width direction.

Reference is made to FIGS. 3 to 6B. The molding 13 is an elastic string-shaped member having a T-shaped section. The molding 13 includes an ornamental portion 13a and a fixing portion 13b. The ornamental portion 13a is formed into a band shape and exposed to the outside of the vehicle body. The fixing portion 13b has a band shape protruding from a back surface of a central portion of the ornamental portion 13a. A recess 13c (see FIGS. 4A and 4B) is formed between the ornamental portion 13a and the fixing portion 13b. A flat molding mounting seat surface 12e is formed along the upper edge on the back surface of the end portion in the vehicle width direction 12a of the spoiler 12. The fixing portion 13b of the molding 13 is fixed to the molding mounting seat surface 12e by a double-sided adhesive tape 20.

Figure 4A:
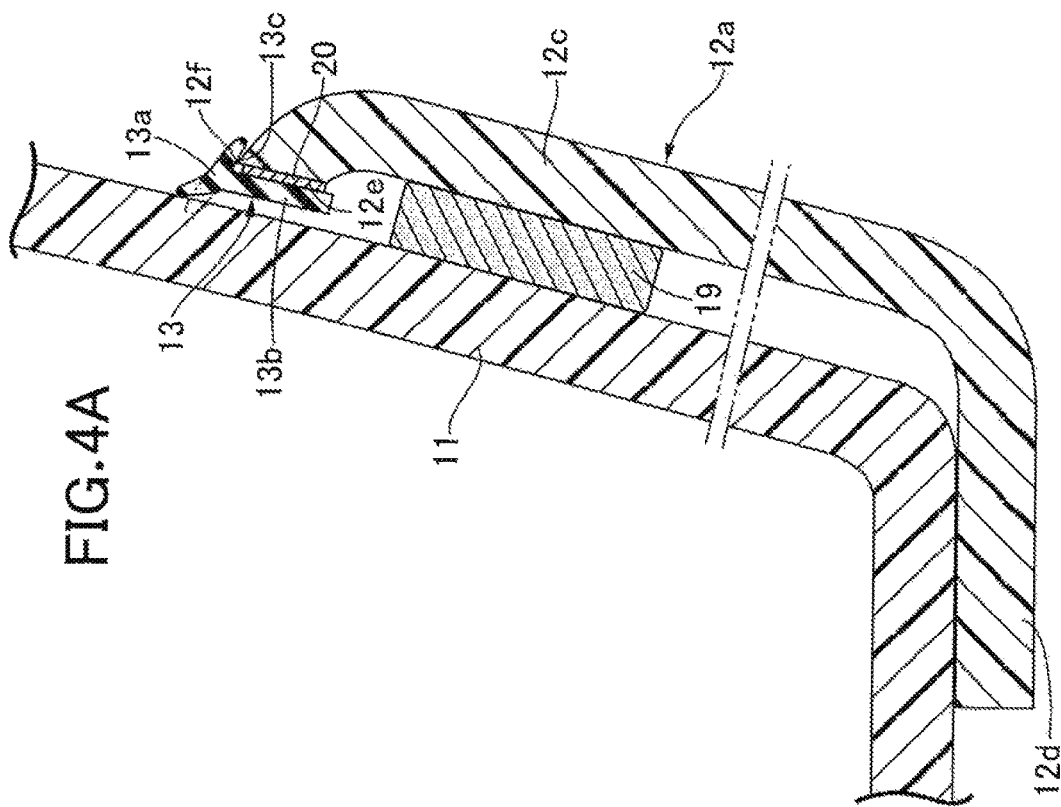
FIGS. 4A and 4B are sectional views taken along a line 4A-4A and a line 4B-4B in FIG. 3, respectively.
Figure 4B:
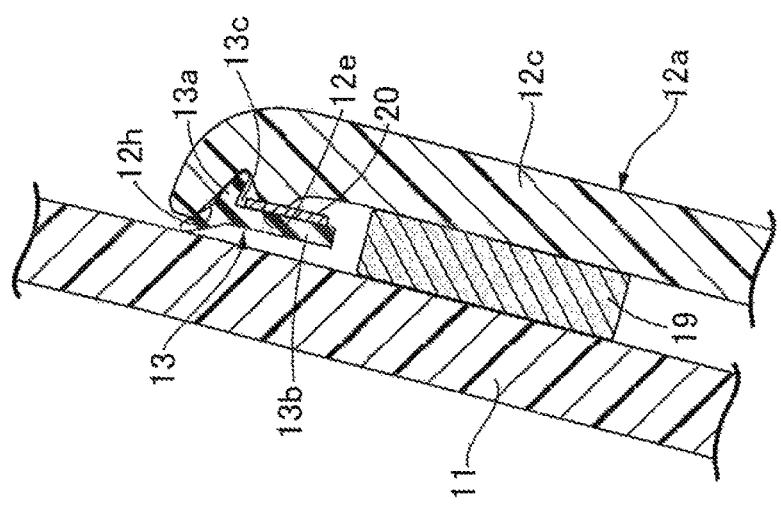
Figure 5:
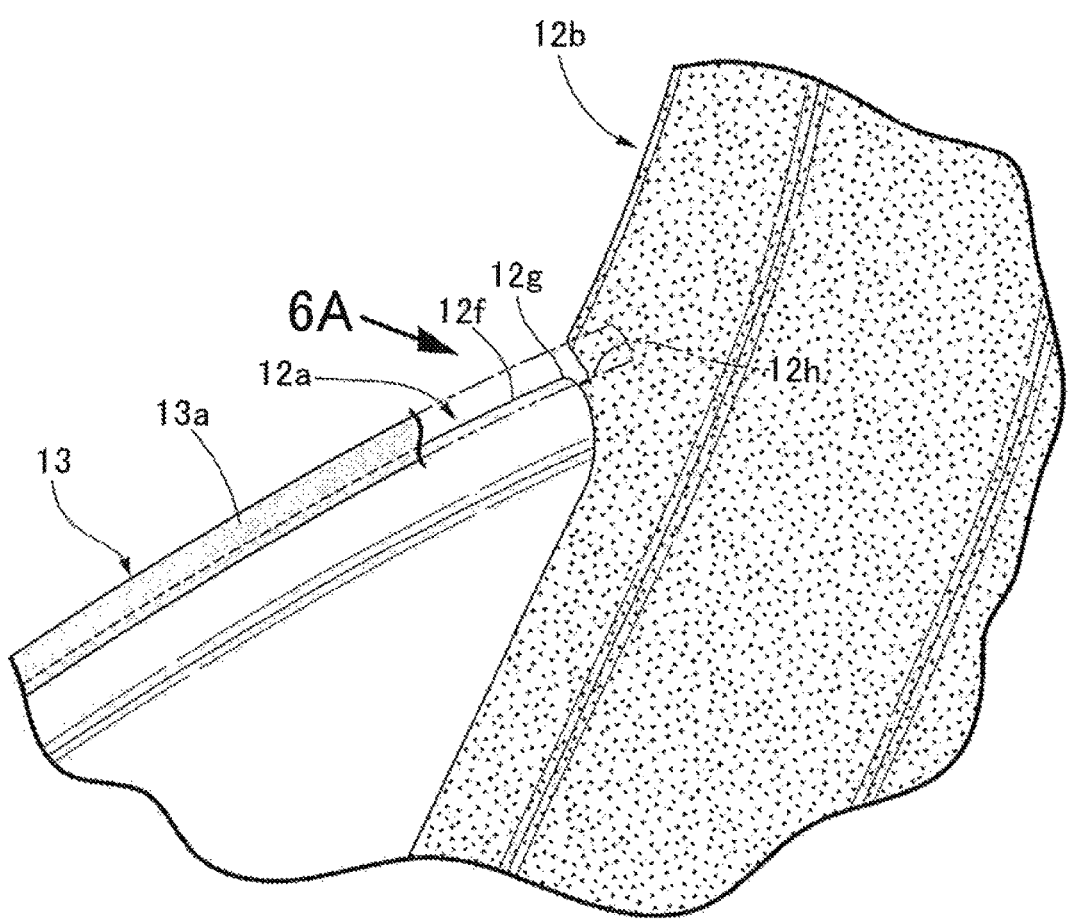
FIG. 5 is a view taken in a direction of an arrow 5 in FIG. 3.
Figure 6A:
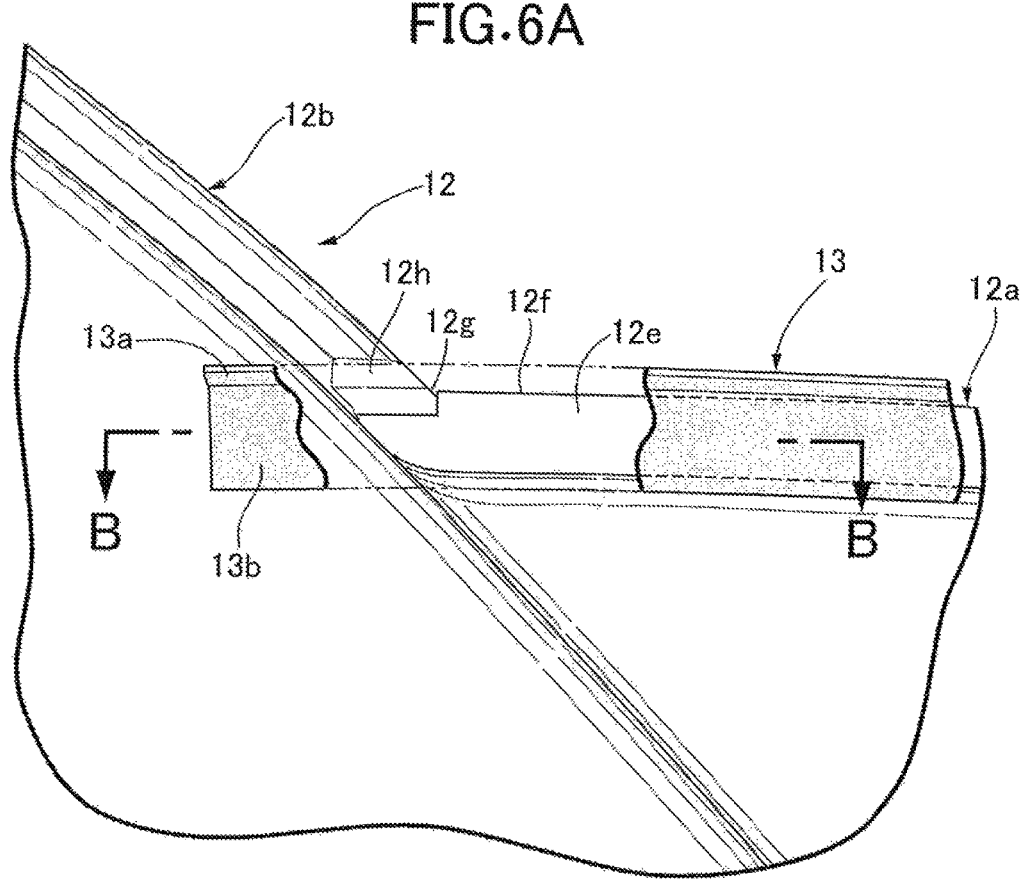
FIGS. 6A and 6B are views taken in a direction of an arrow 6A in FIG. 5.
Figure 6B:
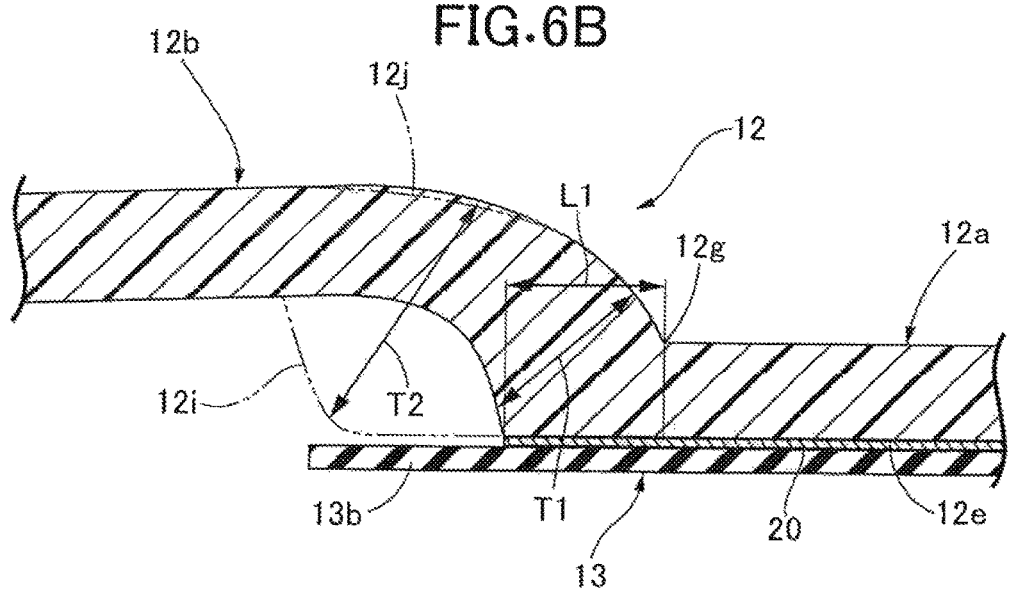

At this time, a protrusion 12f formed on the upper edge of the end portion in the vehicle width direction 12a of the spoiler 12 is fitted into the recess 13c of the molding 13, so that the molding 13 is rigidly supported by the upper edge of the end portion in the vehicle width direction 12a of the spoiler 12 (see FIG. 4A). Under a condition in which the molding 13 is installed, a front end of the ornamental portion 13a of the molding 13 contacts the front surface of the bumper 11 to be elastically deformed. A gap between the bumper 11 and the spoiler 12 is thereby filled to achieve enhanced aesthetic appearance.

A side formed by the upper edge of the end portion in the vehicle width direction 12a of the spoiler 12 and a side formed by the upper edge of the central portion in the vehicle width direction 12b of the spoiler 12 cross each other at a recessed corner portion 12g at an obtuse angle. An end portion of the molding 13 is entered inside the central portion in the vehicle width direction 12b of the spoiler 12 at the recessed corner portion 12g. Specifically, a short groove-shaped cutout portion 12h (see FIG. 6A) extending in the vehicle width direction is formed so as to be connected to an upper side of the inner end in the vehicle width direction of the molding mounting seat surface 12e that is formed along the side of the upper edge on the back surface of the end portion in the vehicle width direction 12a of the spoiler 12. The ornamental portion 13a of the molding 13 is fitted into this cutout portion 12h and the end portion of the molding 13 is thereby fitted into the inside of the central portion in the vehicle width direction 12b of the spoiler 12. As a result, when the vehicle body is viewed from the rear, an edge of the central portion in the vehicle width direction 12b of the spoiler 12 serves as a parting line to thereby cover the end portion of the molding 13.

The operation of the embodiment of the present invention having the configuration described above will be described below.

The fixing portion 13b of the molding 13 that has previously been cut to a predetermined length is fixed using the double-sided adhesive tape 20 to the molding mounting seat surface 12e of the spoiler 12 before mounting. The cut length of the molding 13 at this time does not need to be strictly controlled and the molding 13 is required only to protrude a predetermined distance (e.g., approximately 10 mm) from the molding mounting seat surface 12e. Then, the back surface of the spoiler 12 is fixed to the front surface of the bumper 11 using the double-sided adhesive tape 19 so as not to allow the spoiler 12 from separating from the bumper 11. Additionally, using the four tapping screws 15 and the six tensile clips 16, the spoiler 12 is rigidly fixed to the bumper 11.

When the spoiler 12 is fixed to the bumper 11 as described above, the front end of the ornamental portion 13a of the molding 13 elastically abuts against the front surface of the bumper 11 to thereby fill the gap between the bumper 11 and the spoiler 12, thus achieving enhanced aesthetic appearance (see FIG. 4A). Because the spoiler 12 is fixed to the bumper 11 so as to be pressed up thereagainst by the six tensile clips 16, a gap between the bumper 11 and the spoiler 12 can never be widened, so that any gap is prevented from being produced between the front surface of the bumper 11 and the molding 13.

At this time, the protrusion 12f formed on the upper edge of the end portion in the vehicle width direction 12a of the spoiler 12 is fitted into the recess 13c of the molding 13, so that the molding 13 is rigidly supported by the upper edge of the end portion in the vehicle width direction 12a of the spoiler 12 (see FIG. 4A). With the molding 13 installed in position as described above, the front end of the ornamental portion 13a of the molding 13 contacts the front surface of the bumper 11 to thereby be elastically deformed. The gap between the bumper 11 and the spoiler 12 is thereby filled for the enhanced aesthetic appearance.

The gap between the spoiler 12 and the bumper 11 is shade and recognized as black. A gap existing between the spoiler 12 having a low level of brightness and the bumper 11 is hard to be recognized. In contrast, a gap existing between the spoiler 12 having a high level of brightness and the bumper 11 is easily recognized.

In the present embodiment, the end portions in the vehicle width direction 12a of the spoiler 12 are painted in color having a high level of brightness and the central portion in the vehicle width direction 12b of the spoiler 12 is painted in black having a low level of brightness. The molding 13 is attached to each of the end portions in the vehicle width direction 12a painted in color having a high level of brightness, but not to the central portion in the vehicle width direction 12b painted in black having a low level of brightness. Thus, noticeable gaps that are produced between the end portions in the vehicle width direction 12a of the spoiler 12 and the bumper 11 can be covered by the molding 13 with a minimum essential length, thereby achieving aesthetic appearance. Because in a boundary portion at which the painted color changes between the end portion in the vehicle width direction 12a and the central portion in the vehicle width direction 12b, presence or absence of the molding 13 is switched, the spoiler 12 is recognized as including a plurality of components painted in different colors from each other, so that the degree of freedom in design can be enhanced.

Consider an arrangement in which the molding 13 is cut at the recessed corner portion 12g of the spoiler 12 and the cut end portion of the molding 13 is abutted against the wall portion of the central portion in the vehicle width direction 12b of the spoiler 12. In this case, due to variations in the cut length of the end portion of the molding 13 or changes in the cut length caused by thermal expansion or thermal shrinkage, if the molding 13 is too short, a gap may be produced in the end portion thereof and if the molding 13 is too long, the molding 13 may be raised by the end portion thereof being pushed. This can degrade aesthetic appearance of the molding 13.

In the present embodiment, however, the end portion of the molding 13 is inserted through the groove-shaped cutout portion 12h of the spoiler 12 into the inside of the central portion in the vehicle width direction 12b. The end portion of the molding 13 is covered by the edge of the central portion in the vehicle width direction 12b of the spoiler 12 serving as a parting line, without being affected by variations in the length of the molding 13. This contributes to enhanced aesthetic appearance.

The molding 13 is fixed to the molding mounting seat surface 12e of the spoiler 12 by the double-sided adhesive tape 20. Therefore, to rigidly fix the end portion of the molding 13 to the spoiler 12, the molding mounting seat surface 12e is desirably extended toward the central portion in the vehicle width direction 12b side as illustrated by the dot-dash line in FIG. 6B. The extension of the molding mounting seat surface 12e, however, forms a bulged portion 12i at a position near the recessed corner portion 12g of the plate-shaped spoiler 12, resulting in an increased wall thickness T2. As a result, a sink mark 12j may occur on the surface of the spoiler 12 formed of a synthetic resin, thus degrading the aesthetic appearance.

In the present embodiment, however, a length L1, along the cutout portion 12h at the recessed corner portion 12g, of the molding mounting seat surface 12e is equivalent to a wall thickness T1, around the recessed corner portion 12g, of the spoiler 12. This prevents the sink mark 12j from occurring on the surface of the spoiler 12, thus achieving aesthetic appearance.

An embodiment of the present invention is explained above, but the present invention may be modified in a variety of ways as long as the modifications do not depart from the gist of the present invention.

For example, the main member of the present invention is not limited to the bumper 11 of the embodiment and the exterior part of the present invention is not limited to the spoiler 12 of the embodiment.

In addition, although the end portions in the vehicle width direction 12a of the spoiler 12 are painted in color having a high level of brightness and the central portion in the vehicle width direction 12b of the spoiler 12 is painted in black, the end portions in the vehicle width direction 12a and the central portion in the vehicle width direction 12b may be pained in any color.

What is claimed is:

1. A mounting structure of an exterior part comprising:
   a main member;
   the exterior part mounted on a front surface of the main member; and
   a long molding mounted along an outer periphery of the exterior part so as to fill a gap between the exterior part and the front surface of the main member, the outer periphery forming an outline of the exterior part,
   wherein the molding is a string-shaped member having a T-shaped cross-section, the molding including:
      an ornamental portion which is formed into a band shape and exposed to an outside,
      a fixing portion of a band shape protruding from a back surface of a central portion of the ornamental portion, and
      a recess formed between the ornamental portion and the fixing portion and capable of being fitted to the outer periphery of the exterior part,
   the outer periphery of the exterior part includes a recessed corner portion at which two sides of the outer periphery of the exterior part cross each other, one of the two sides that constitute the recessed corner portion includes a protrusion capable of being fitted into the recess of the molding and an other of the two sides includes a cutout portion disposed adjacent to the protrusion, the cutout portion permitting insertion of the molding therethrough under a condition in which the exterior part is mounted on the front surface of the main member, and
   the exterior part is mounted on the front surface of the main member under a condition in which an end portion of the molding mounted on the one side is inserted into the cutout portion.

2. The mounting structure of an exterior part according to claim 1, wherein
   the exterior part is a plate-shaped member formed of resin,
   the molding is fixed so as to be damped between the front surface of the main member and a molding mounting seat surface formed along the outer periphery of the exterior part, and
   a length, along the cutout portion at the recessed corner portion, of the molding mounting seat surface is equivalent to a wall thickness, around the recessed corner portion, of the exterior part.

3. The mounting structure of an exterior part according to claim 1, wherein
   the exterior part is painted in a plurality of colors having different levels of brightness, and
   the molding is mounted to a portion painted in color having a high level of brightness, but not to a portion painted in color having a low level of brightness.

4. The mounting structure of an exterior part according to claim 2, wherein
   the exterior part is painted in a plurality of colors having different levels of brightness, and
   the molding is mounted to a portion painted in color having a high level of brightness, but not to a portion painted in color having a low level of brightness.

5. The mounting structure of an exterior part according to claim 1, wherein the exterior part and the main member are fixed by a tensile clip disposed near the cutout portion.

6. The mounting structure of an exterior part according to claim 2, wherein the exterior part and the main member are fixed by a tensile clip disposed near the cutout portion.

7. The mounting structure of an exterior part according to claim 3, wherein the exterior part and the main member are fixed by a tensile clip disposed near the cutout portion.

8. The mounting structure of an exterior part according to claim 4, wherein the exterior part and the main member are fixed by a tensile clip disposed near the cutout portion.

* * * * *